Jan. 17, 1928.

W. V. N. POWELSON ET AL 1,656,236

AIRSHIP

Filed Oct. 22, 1921   5 Sheets-Sheet 1

INVENTORS:
WILFRID V. N. POWELSON
WARREN TRAVELL
BY Mitchell, Chadwick & Kent
attys.

Jan. 17, 1928. 1,656,236
W. V. N. POWELSON ET AL
AIRSHIP
Filed Oct. 22, 1921 5 Sheets-Sheet 2

INVENTORS:
WILFRID V. N. POWELSON
WARREN TRAVELL
BY *Mitchell, Chadwick & Kent,*
attys.

Jan. 17, 1928.

W. V. N. POWELSON ET AL 1,656,236

AIRSHIP

Filed Oct. 22, 1921

INVENTORS:
WILFRID V. N. POWELSON
WARREN TRAVELL

Jan. 17, 1928.

W. V. N. POWELSON ET AL

1,656,236

AIRSHIP

Filed Oct. 22, 1921

INVENTORS:
WILFRID V. N. POWELSON
WARREN TRAVELL
BY Mitchell, Chadwick & Kent,
attys.

Patented Jan. 17, 1928.

1,656,236

UNITED STATES PATENT OFFICE.

WILFRID V. N. POWELSON AND WARREN TRAVELL, OF NEW YORK, N. Y.

AIRSHIP.

Application filed October 22, 1921. Serial No. 509,509.

This invention relates to improvements in airships. More particularly it relates to such improvements as will adapt an airship for alighting on the surface of a body of water, for being moored while floating thereon, and for starting a flight therefrom. To this end it provides a new type of airship which may for convenience be termed a hydro-air ship.

Although aeroplanes have been developed for alighting on and flying from water surfaces, no successful attempt has yet been made for adapting airships supported by lighter-than-air gas to such operations. The objects of this invention are to provide means whereby an airship (1) may, at the end of a flight, safely alight on the surface of a body of water, and without the need for a large number of attendants; (2) may be securely moored while thus floating on water; (3) may have the stresses in its structural frame, resulting from the action of water waves while thus moored, reduced to a minimum; (4) may have stability against excessive rolling motions while floating on water; (5) may start its flight through the air quickly and easily; and (6) may be possessed of all these various functions and advantages whether it is with its load heavier during flight than the air displaced thereby, or is during flight wholly supported by the buoyancy of lighter-than-air gas.

In adapting an airship for alighting on the surface of a body of water, the lower portion of the airship is so shaped and constructed as to form a water-tight vessel capable of floating on water; or a number of pontoons may be attached to the airship in such manner that the airship is supported on these pontoons when floating on water. Such pontoons may be so constructed as to be easily withdrawn within the envelope of the airship, or they may be collapsed when not in use, either or both of which devices will reduce air resistance during flight. Another method of providing such supporting pontoons is to make use of the power, passenger and load-carrying cars by placing such cars in suitable positions below the airship and providing them with watertight bodies.

The structural frame of an airship when alighting or floating on water will be subjected to bending stresses resulting from the wave action of the water during rough weather unless special provision is made to prevent such stresses. The invention provides for this by an elastic type of connection between the airship and its supporting pontoons when pontoons are used, and by an elastic type of connection between the several transverse sections of the structural frame of the airship itself when the airship is floating on water without pontoons. In the former case, the elastic connections are so that each pontoon may transmit to the structural frame of the airship only a limited, predetermined uplift; in the latter case, the elastic connection between the sections of the frame permit of a degree of flexibility in the general shape of the airship so that it will conform somewhat to the surface of the wave-roughened water upon which it rests. By thus preventing the formation of stresses in the structural frame of an airship, resulting from wave action, the size and weight of the structural frame is considerably reduced from what would otherwise be required.

Instead of having these pontoons permanently attached to the airship, they may be separately constructed so as to form a floating cradle upon which the airship may be lowered and to which it may be securely fastened. In such case the pontoon cradle is attached to a suitable mooring and all stresses due to wave action are taken care of in the structure of the cradle.

The invention provides for the safe mooring of an airship while floating on water, an operation which has thus far not been successfully practiced in the art. The airship is moored by its head end to a fixed buoy or mast, around which it may be freely swung by the force of the wind. In order to obtain stability against excessive rolling and while floating on water, the lower portion of the body is flattened externally. The curved part may be ellipsoidal, and the flattened part may make the whole semi ellipsoidal. The area of the airship's envelope exposed to lateral wind pressure is thus reduced, the distance of the center of this air pressure above the surface of the water is lessened, and the length of the arm of the gravity-buoyancy couple tending to right the airship is considerably increased. In case pontoons are used, the same stability against rolling motion is obtained by locating the several pontoons at suitable distances on each side of the keel of the airship. It will be observed, moreover, that if the airship be moored as above proposed, it will normally stand head toward the wind, and will be maintained so automatically by the wind whenever the wind veers.

These various improvements may be used in connection with an airship which obtained its entire support during flight from lighter-than-air gas according to common practice, or they may be used in connection with an airship which, with its normal load is heavier-than-air and which has the buoyancy of its lighter-than-air gas supplemented during flight by the uplift of air surface of the airships, either directly or on aerofoils attached thereto.

It is a fundamental feature of this invention to provide for handling an airship at a station, so that the following new and valuable results are obtained.

1. The great cost of a hangar for housing the airship is eliminated;

2. The liability of damage to the airship during entrance to and exit from such a hangar is obviated;

3. Having the equipment herein described, an airship may alight with safety on any body of water of suitable size and having proper wind protection;

4. After so alighting it may be anchored or moored to a buoy of nominal cost;

5. While thus moored, entrance to and exit from the airship is easier and safer than when moored to a tower or by guy lines according to present methods;

6. The danger of destruction of the airship by having one end blown down to the ground is obviated, which danger is very great with existing methods of mooring in the open;

7. An airship equipped for alighting on water and having the lifting power of its gas supplemented by aerofoils, may be propelled along the water surface until it attains such a speed that the aerofoils will lift the airship from the water, after which they will continue to support the excess weight of the airship during flight through the air. This enables an airship to start its flight carrying a load considerably in excess of what is possible by present methods. During the progress of a flight, this excess load will be balanced wholly or in part by the consumption of fuel, oil and supplies, so that when the airship arrives at its destination it may weigh but little more than the displaced air. Also, during flight, the complicated and troublesome operations of discharging gas and ballast will be largely obviated by the use of the aerofoils for maintaining the airship at the desired elevation.

8. By so doing, the further advantage is obtained of saving the value of the considerable amount of gas ordinarily expended during a trip.

9. In addition to this there is no delay attendant upon refilling the gas bags at the end of a trip, since the airship after discharging its load and taking on a new load is immediately ready for another trip;

10. The alighting of an airship on water and the flying therefrom as described herein will require little or no assistance. A considerable economy in operating costs may be thus effected by dispensing with the very large number of attendants required at stations to assist in the handling of an airship according to existing methods.

11. While floating on water in a moored position, a quantity of water ballast may be easily taken on board so that the airship will be stable as regards buoyancy, and no further attention will be required in this connection while thus moored. As compared with this, the condition of an airship, while moored to a tower or by guy lines according to existing methods, is such that constant and expert attention by a trained crew is required to maintain the airship safely in horizontal equilibrium. Changes in direction and force of the wind, changes in temperature and changes in barometric pressure affect the ship's equilibrium and have to be cared for by the shifting of ballast. The accumulation of snow and ice occurring during a storm presents an especially grave danger to an airship moored in the air, but is a matter of little or no concern to an airship floating on water.

12. The several advantages which will result from the use of the apparatus and the system of operation set forth herein are cumulative as regards the effect which they will have in making successful the establishment of the commercial airship business.

Following is a description of the figures in the accompanying drawings, which are more or less diagrammatic representations of airships embodying the invention.

Figure 1:
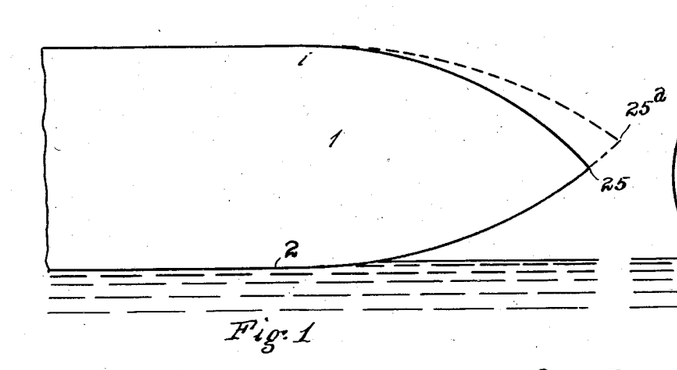
Figs. 1 and 2 are side and end elevations of a portion of an airship having its lower surface flattened for increasing its stability while floating on water.
Figure 2:
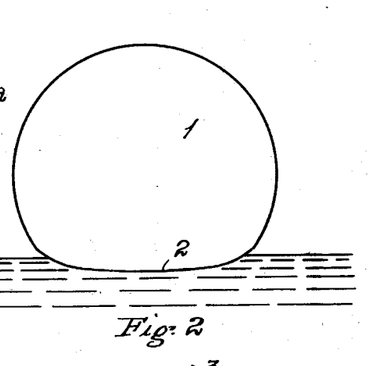

In Figs. 1 and 2, the airship 1 is shown with its envelope 2 which surrounds and covers the succession of sections or compartments made by the frame, which are adapted to hold containers 26 of the usual or of any suitable sort for holding lighter-than-air gas. The airship is shown as having cross-sections generally circular in shape with lower portion of water-tight construction and flattened somewhat. The flattening of this part of the ship increases the stability of the airship against rolling motion while floating on water, and increases the power of the airship to start on a flight when statically heavier than the air which it displaces, by acquiring dynamic lift through the agency of its propulsion engines.

Figure 3:
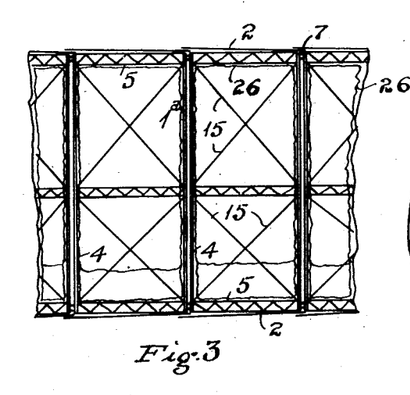
Figs. 3 and 4 are elevations in longitudinal and transverse section of a slightly different shape of airship, showing its structural frame, Fig. 3 being on the line 3—3 of Fig. 4.
Figure 4:
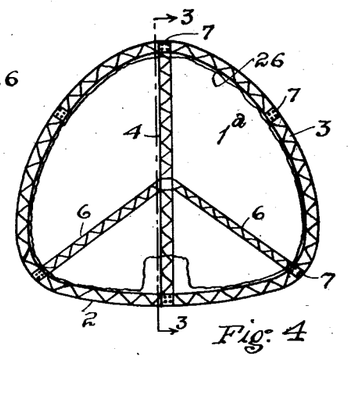

In Figs. 3 and 4, the airship 1ᵃ is shown as having a more triangular shape of cross-section, with curved sides and rounded corners. The advantages of such a shape over the common circular form are that, with such a shape, not only is the stability of the airship against rolling increased, but the moment of the force of the wind tending to overturn the airship is reduced; and the volumetric capacity for holding gas in proportion to the length of perimeter of cross-section is maintained at a high ratio. The structural frame is shown as comprising encircling girders 3 and cross ties 15, with vertical girders 4, a longitudinal girder 5, and struts 6 extending from the axis to the lower outside corners. It is evident that the frame-work for giving rigidity to an airship of one of the improved shapes herein described may be built in a great number of different ways and with infinite variety of detail.

Figure 5:
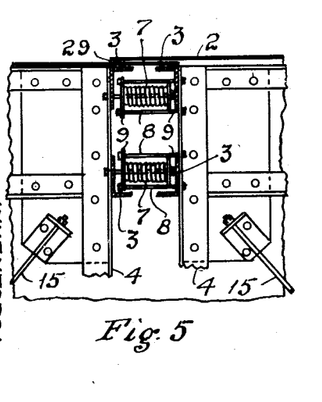
Fig. 5 is a view of a detail of Fig. 3, on a much larger scale, showing a flexible connection between the sections of the structural frame.

In Fig. 5, showing the details of a flexible connection between the sections of the structural frame, compression springs 7 are held between pairs of head plates 9, which are connected by bolts 8 to adjacent girders 3. In order to obtain necessary strength and proper working, such springs may be arranged in groups at a number of locations around the perimeter of the airship. By the use of such a device the structural frame of the airship becomes possessed of a certain degree of flexibility whereby its lower surface may conform somewhat to the water surface upon which the airship is floating, thereby reducing the stresses in the airship's structure from what would occur in the absence of such flexibility. In this construction the envelope 2 is made in overlapping sections, Figures 3, 5, with water-tight gaskets 29.

Figure 6:
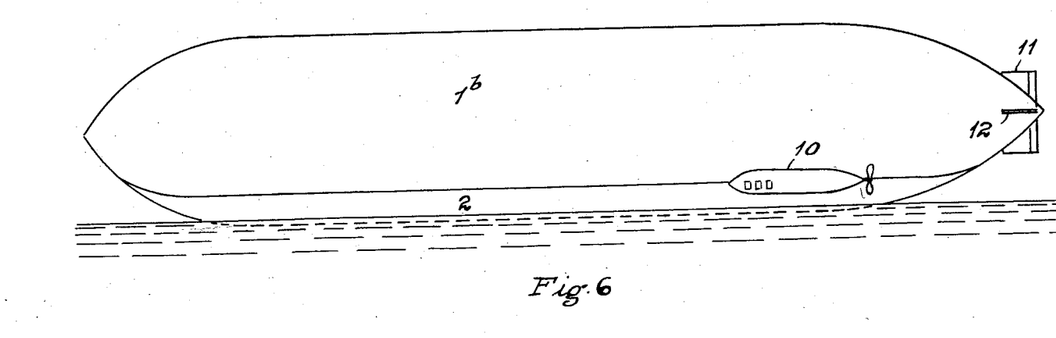
Fig. 6 is a side elevation of another airship, having its lower surface of a different shape.
Figure 7:
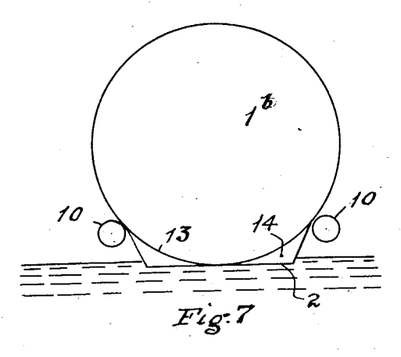
Fig. 7 is an end elevation of the airship of Fig. 6.
Figure 8:
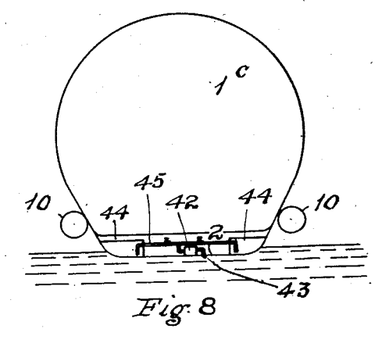
Fig. 8 is an end elevation of another airship, having its lower surface of another shape.

In Figures 6 and 7 the airship 1ᵇ has its power cars 10 attached to it at such an elevation that they may clear the water when the airship is in floating position. Fig. 7 shows an improved shape of airship in which the ordinary circular section is maintained, with the addition of wedge shaped undersections or supports enclosing compartments 14 along each side at the bottom, so arranged between the circular part and the water as to provide a broad flat bottom for stability while floating on water, and also suitably located room for passengers' and crew's quarters and for the storage of cargo, ballast and supplies. This construction also permits of the location of the longitudinal passageway outside of the circular section, thus allowing practically the whole cross sectional area of the circular part to be filled with gas containers. This in turn permits of increasing their volumetric capacity and simplifying their construction without any increase in their weight as compared with contruction hitherto practiced. Another design, in which the envelope of the ship 1ᶜ has a shape of outside surface similar to that of Fig. 7, is shown in Fig. 8, but in this the partition 13 between the cylindrical body and the wedge shaped compartments 14 is omitted.

Figure 9:
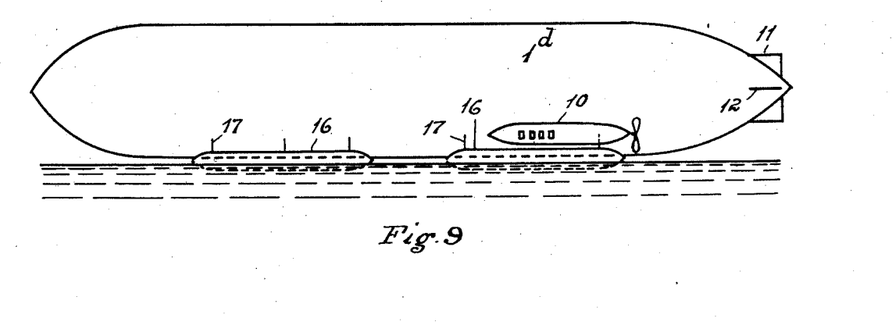
Fig. 9 is a side elevation of an airship supported on a pontoon cradle floating on water.
Figure 10:
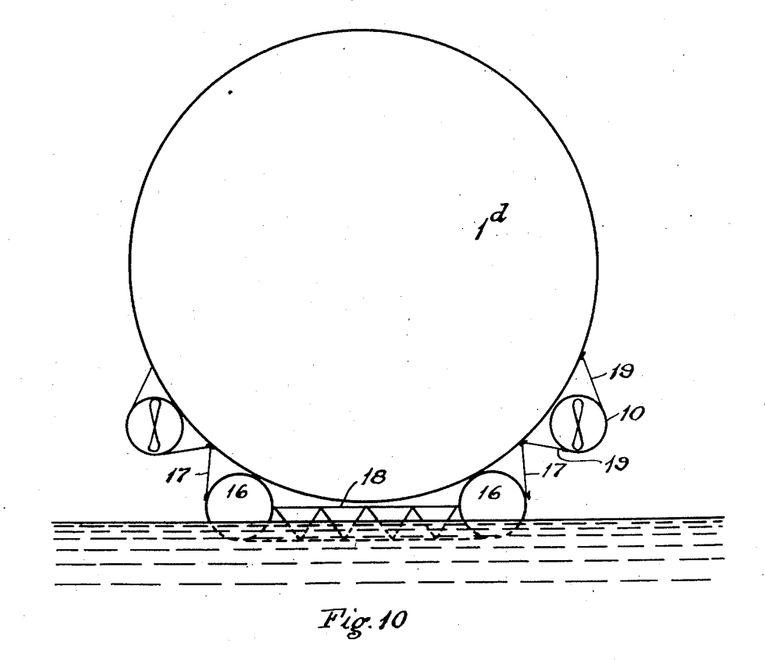
Fig. 10 is an end elevation of same on a larger scale.

Figs. 9 and 10 show an airship 1ᵈ equipped with power cars 10 and supported on floating cradles consisting of pairs of pontoons 16, each of which is tied together by rigid members 18. After lighting on the pontoon cradles, the airship is securely fastened thereto by lines 17. The use of such cradles for mooring an airship over water has the advantages over the water-tight bottom type that it lessens the weight of the airship and reduces structural stresses therein resulting from wave action. On the other hand, the use of such cradles or other special mooring devices, limits the movements of an airship to flying only between stations equipped with such devices, and requires careful manipulation during the operation of alighting.

Figure 11:
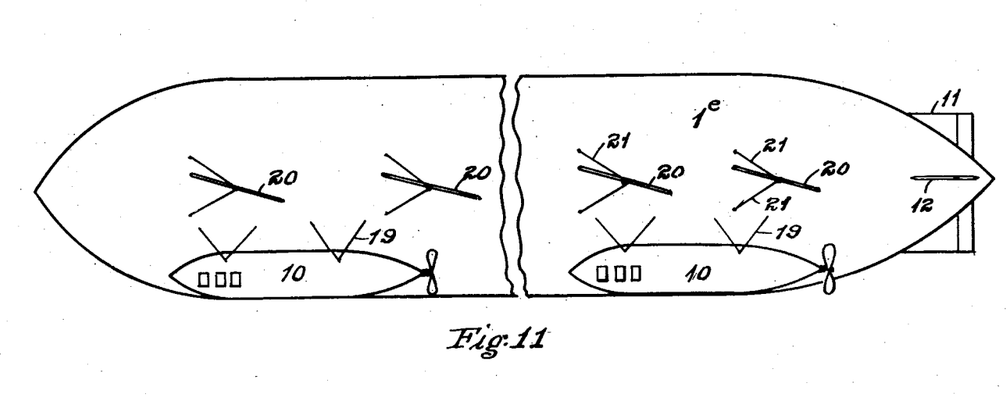
Fig. 11 is a side elevation of an airship equipped with aerofoils and having its lower surface and the lower surface of its power-cars adapted for floating on water.
Figure 12:
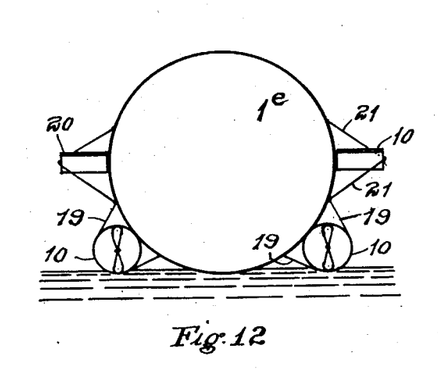
Fig. 12 is an end elevation of the same showing the airship floating on water.

In Figs. 11 and 12, the airship 1ᵉ is equipped with pivotted aerofoils 20 which are capable of exerting a lifting force upon the airship during its forward motion. In the particular arrangement illustrated the aerofoils 20 are located at the sides of the body of the ship, about midway from top to bottom; and have stays 21 to support their outboard ends. The cars 10, which may carry the "disposable load" as well as the propulsion equipment, have water-tight bottoms and are so attached to the airship along its sides, as by stays 19, that when the airship alights on water, their buoyancy will tend to support the weight of the ship, or they may be so located as shown in Fig. 12 that the lower surface of the airship as well as of the cars is in contact with the water.

Figures 14, 15, 16:
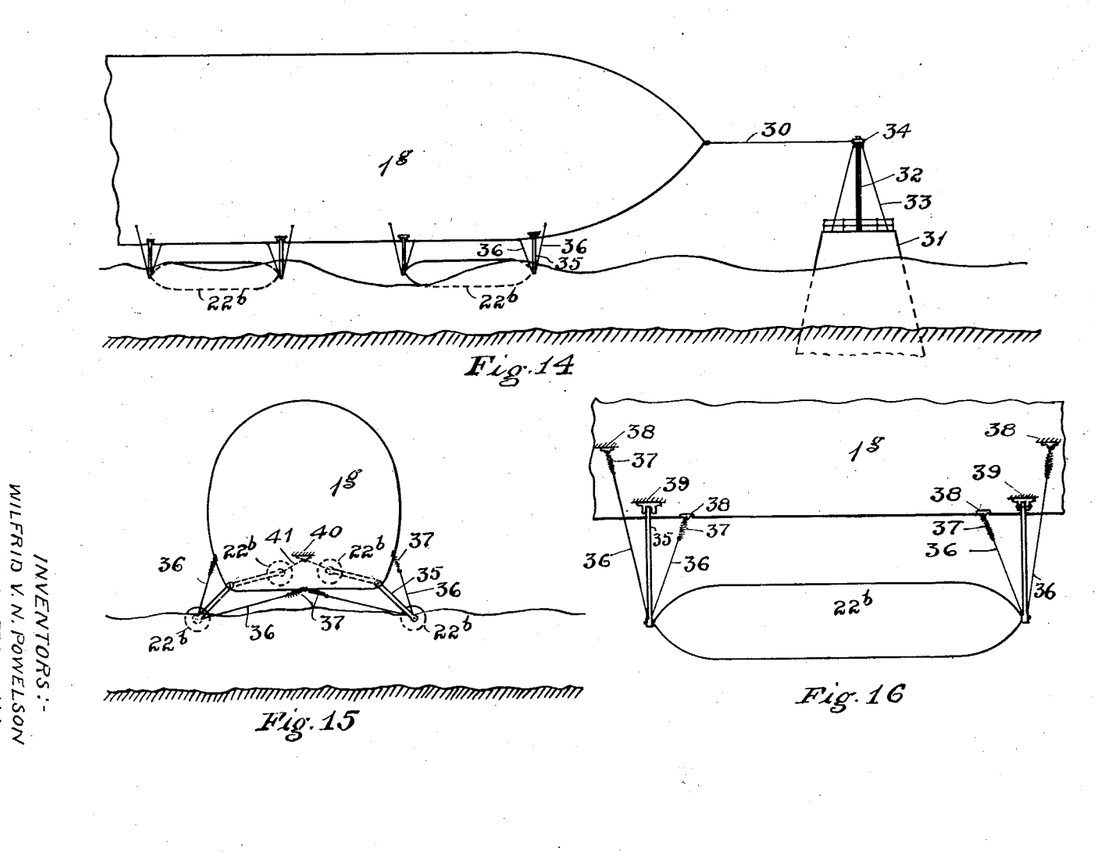
Fig. 14 is a side elevation of another airship moored to a fixed mooring mast and supported by floating pontoons.
Fig. 15 is an end elevation of same.
Fig. 16 is a side elevation of a portion of the same on a larger scale.

In this connection, it is a feature of the invention to take advantage of the fact that an airship of the lighter-than-air type (whether it be actually air buoyant when in flight or be carrying a load which makes it practically heavier than air in flight) is supported on water mainly by its air buoyancy, and rests but lightly on the water, relative to its total weight, and so causes very little displacement of water. This feature also enables a ship of the second mentioned type to be driven by its own air propellers over the water with such acceleration that the necessary speed is attained for the dynamic lift of the aerofoils to become effective to supplant the water in carrying the excess weight, above that which the gas or other direct lifting appliance can carry. This may be seen in marked phase in those forms of the invention in which the underbody of the envelope 2 rests on the water. In such cases its great area makes the needed water buoyancy attainable with a draft in water that is hardly discernible. The fore part of the under body of the airship is preferably inclined upward to the prow; and if this be on different lines from the inclination of the top upward and backward from the prow, the airship body may become an element co-operating with the propulsion force to bring about its own elevation by dynamic uplift. For example, an airship heavier than air having the cross-sectional shape of body shown in Figs. 2, 4, 7 or 8, or especially that shown in Fig. 15, is adapted to sustain itself during flight by the excess of the upward component of air pressure on its under side over the downward component of air pressure on its upper side, as is evident on consideration of the fact that the pressure on a flat surface exposed to the wind is double that which is produced by the same wind on a cylindrical surface of equal projected area. This excess of pressure or uplift during flight may be further increased by shaping the fore-part of an airship with its prow above mid-height of the body as shown at 25$^a$, Fig. 1. When such an airship is driven forward over water the dynamic lift resulting from air pressure under its fore part will lift the fore part a little; and this lifting will immediately expose the flattish bottom of the ship to act as an aerofoil, with a larger area whose effect is relatively great, inasmuch as the weight to be lifted, in addition to that borne by the lighter-than-air gas therein, is relatively small. In consequence, although we have shown aerofoils 20 for providing dynamic lift, it is clear that dynamic lift can also be provided to assist the aerofoils at starting, or regularly, by a shape of body which also adapts the ship for floating with stability and small draft.

Figure 13:
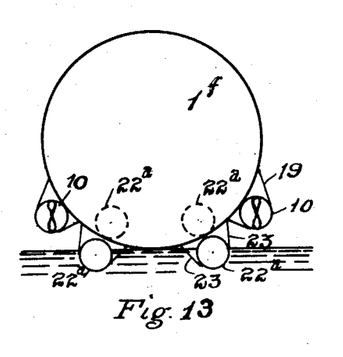
Fig. 13 is an end elevation of an airship supported on floating pontoons.

Fig. 13 shows the cars 10 attached to the airship 1$^f$ at a higher elevation so that they are clear of the water, and separate pontoons 22$^a$ for supporting the airship while floating on water. These pontoons may be secured to the airship by stays 23 and be of such limited buoyancy that each pontoon will transmit to the structural frame of the airship only a limited, predetermined amount of load. During flight, in order to reduce wind resistance, the pontoons 22$^a$ may be withdrawn within the airship's envelope to the dotted line positions or they may be collapsible. In the latter case they may be constructed with flexible coverings inflated by air which may be deflated while in flight, and can be readily inflated by power means on board when their use is desired.

Fig. 14 shows an air ship 1$^g$ moored to a fixed mast 32 by means of a rope 30 attached to a collar 34 rotatable about the mast. It is evident that while thus moored the airship will always ride head on to the wind, swinging freely around the mooring mast. The airship is further shown as being supported by a number of floating pontoons 22$^b$. These pontoons are water-tight vessels of relatively small weight and great buoyancy, and are so attached to the airship 1$^g$, Figs. 14, 15, 16, that they may be raised and lowered by waves without materially changing the stresses which they impart to the airship while supporting it on a body of water. A pair of struts 35, pivotally attached to the ship's frame at 39, hold a pontoon 22$^b$ at a distance from the ship. As shown in Fig. 15, these pontoons may be so held, while supporting the ship, that the ship's stability against overturning is greatly increased over what it would be if the ship itself were floating on the water without pontoons. Resiliency of the pontoons with the resulting limitation of transmitted stresses is obtained in the arrangement shown by means of lines 36 having springs 37 which exert approximately constant pulls at the outstanding ends of the struts 35 and at the same time permit these ends and the pontoons which they carry to rise and fall with wave action. Provision is made so that, during flight, to reduce air resistance, these pontoons may be withdrawn within the airship's envelope to the positions shown by dotted lines, Fig. 15, and fastened in such raised positions by rope 41 to fixed points of attachment 40.

In general, this invention provides for a complete system of operation and apparatus therefor by which an airship may, at the end of a flight through the air, descend to the surface of a body of water, may alight and safely float thereon without damage to its structure, may be securely moored while thus floating and, finally, may rise from the water at the start of a flight whether the airship and its load be heavier or lighter than the air displaced thereby. In the case of an airship which with its load is lighter-than-air during flight, the buoyancy of the ship may be lessened by wasting gas, by compressing a portion of it or by reducing its temperature, as set forth in our application for patent, Serial No. 496,605, thus permitting the ship to descend close to the surface of a body of water. In order to increase the weight and stability of the airship water may then be drawn up through pipe 43, Fig. 8, by means of a pump 42, and distributed by pipe 45 to tanks 44 suitably located in the airship. While the ship is floating and moored new gas may then be taken on to replace any which may have been wasted in descending. At the start of a flight, the ship is released from its mooring and sufficient water ballast is discharged so that the ship once more becomes with its load lighter than air, whereupon it ascends and proceeds upon its flight. It is evident that the operations involved in thus descending to the surface of a body of water, floating thereon, mooring and starting a flight therefrom may be performed by the ship's crew with little, if any, assistance from attendants at the mooring station, and that our system of operation as a whole possesses many important advantages over methods now in use, and provide a decided advance in the art of aerial flight.

In the practical application of the invention thus set forth, various devices may be employed in substitution for those which are herein shown as illustrating the principles involved; and variations may be made in many respects without departing from the scope of the invention. It is intended that the patent shall cover by suitable expression in the appended claims whatever features of patentable novelty exist in the invention disclosed.

We claim as our invention:—

1. The combination, with an airship having a plurality of power-cars attached laterally thereto for the propulsion thereof, of water-tight outer surfaces on said power cars, and connections therefrom to the body of the ship whereby said airship is adapted for floating on water.

2. The combination with a rigid airship, supported in part by lighter-than-air gas, and having a plurality of propulsion power-cars attached thereto at opposite sides of the ship's body, of water-tight outer surfaces on said power cars whereby said airship is adapted for floating on water, together with elastic means for attaching said power cars to said airship, whereby stresses in the rigid structure of the airship due to wave action are minimized, while the airship is floating on water.

3. In an airship supported in part by lighter-than-air gas, the combination of a water-tight bottom whereby the airship is adapted to float on water, a structural frame for the airship divided transversely into a plurality of sections and elastic means for connecting the several sections, whereby the stresses in said structural frame are minimized when the airship is floating on a rough body of water.

4. In an airship, supported in part by lighter-than-air gas, and having great length relative to its width sufficient to span a multiplicity of large sea waves, the combination with the frame of the ship of wave-protective water-buoyancy means, comprising a great number of relatively small water-tight vessels connected to the frame, each of them being adapted to apply limited water-buoyancy to the frame, and all of them together being sufficient to support the entire ship, the limitation and relation of buoyancy of each said vessel being such that its total buoyancy is employed and it becomes submerged when uplift of wave imposes a predetermined moderate stress through it upon the frame, the said total buoyancy of each vessel and corresponding moderate stress being so small, in relation to the surplus weight of airship adjacent to it, above that supported by said gas, that normally the said vessel becomes submerged by a passing wave crest, leaving the remainder of said surplus of adjacent airship weight, above said limit of buoyancy of said vessel, to be supported by other and adjacent vessels at which the water level of the instant is lower; whereby the total water-buoyancy is automatically distributed and tends to be equalized along the greater dimension of the ship, notwithstanding fluctuations in the elevation of the supporting water.

5. In an airship, supported in part by lighter-than-air gas, and having great length relative to its width, the combination with the frame of the ship of wave-protective water-buoyancy means, comprising a great number of relatively small water-tight vessels connected to the frame, each of them being adapted to apply limited water-buoyancy to the frame, and all of them together being sufficient to support the entire ship, the limitation of buoyancy of each said vessel being such that it becomes submerged when uplift of wave imposes a predetermined moderate stress through it upon the frame; said water-tight vessels being positioned downward and laterally from the frame; and their said connections to the frame comprising a strut extending to each from the frame and flexibly joined to the frame for swinging about an axis parallel to the ship's axis but held rigidly against movement in the direction of the ship's axis; and resilient stays tying the outer end of the struts to said frame in opposition to said swinging movement; whereby the irregularity of stresses imposed by wave action on the ship through the said supporting vessels is reduced.

6. In an airship, supported in part by lighter-than-air gas, and having great length relative to its width, the combination with the frame of the ship of wave-protective water-bouyancy means, comprising a great number of relatively small water-tight vessels connected to the frame, each of them being adapted to apply limited water-buoyancy to the frame, and all of them together being sufficient to support the entire ship, the limitation of buoyancy of each said vessel being such that it becomes submerged when uplift of wave imposes a predetermined moderate stress through it upon the frame; the connections from the frame to said water-tight vessels being struts arranged to transmit weight of the ship to the vessels and means whereby they yield laterally and resiliently and move with respect to the ship to a limited extent in response to wave movements in water on which they rest, comprising a pivotal connection for the bases and elastic stay connections for the tips of said strut.

7. An airship having a structural frame of sufficient length to span a multiplicity of large sea waves, and an enclosure for lighter-than-air gas, combined with means for adapting the airship for floating on rough water, comprising a multiplicity of pontoons carried by the airship distributively beneath its frame, each of said pontoons being of such limited buoyancy in relation to the weight of adjacent portion of airship that when a wave crest passes it its buoyancy is normally insufficient to raise it on the crest of the passing wave, and having great length relative to its width, and being arranged with its longer axis parallel to the longitudinal axis of the airship; and struts connecting each pontoon to the airship frame adapted to maintain the parallel relation of the said axes while permitting movement of the pontoon transverse to said ship's axis.

8. An airship having a structural frame and an enclosure for lighter-than-air gas, combined with means for adapting the airship for floating on rough water, comprising a multiplicity of pontoons carried by the airship distributively beneath its frame, each of said pontoons being of limited buoyancy and having great length relative to its width, and being arranged with its longer axis parallel to the longitudinal axis of the airship; struts connecting each pontoon to the airship frame adapted to maintain the parallel relation of the said axes while permitting movement of the pontoon transverse to the said ship's axis; and there being elastic stays between the pontoon ends of said struts and spread points on the ship's frame for reducing the stresses imposed by the struts on said frame when said transverse movements occur.

Signed at New York, N. Y., this first day of July, 1921.

WILFRID V. N. POWELSON.
WARREN TRAVELL.